United States Patent
Ishimaru et al.

(10) Patent No.: US 9,774,840 B2
(45) Date of Patent: Sep. 26, 2017

(54) STEREOSCOPIC VIDEO SIGNAL PROCESSING APPARATUS AND METHOD THEREOF

(71) Applicant: Kabushiki Kaisha Toshiba, Tokyo (JP)

(72) Inventors: Dai Ishimaru, Koganei (JP); Hidehito Izawa, Hanno (JP); Takero Kobayashi, Akishima (JP)

(73) Assignees: KABUSHIKI KAISHA TOSHIBA, Tokyo (JP); TOSHIBA VISUAL SOLUTIONS CORPORATION, Aomori (JP)

( * ) Notice: Subject to any disclaimer, the term of this patent is extended or adjusted under 35 U.S.C. 154(b) by 0 days.

(21) Appl. No.: 13/865,065

(22) Filed: Apr. 17, 2013

(65) Prior Publication Data

US 2013/0229488 A1     Sep. 5, 2013

Related U.S. Application Data

(63) Continuation of application No. 13/217,006, filed on Aug. 24, 2011, now abandoned.

(30) Foreign Application Priority Data

Dec. 14, 2010     (JP) ................. 2010-278071

(51) Int. Cl.
| | |
|---|---|
| *H04N 13/00* | (2006.01) |
| *H04N 21/81* | (2011.01) |
| *H04N 21/236* | (2011.01) |

(52) U.S. Cl.
CPC ....... *H04N 13/0044* (2013.01); *H04N 13/007* (2013.01); *H04N 13/0048* (2013.01);
(Continued)

(58) Field of Classification Search
CPC .. H04N 5/278; H04N 13/0048; H04N 13/007; H04N 13/0066; H04N 2213/005
See application file for complete search history.

(56) References Cited

U.S. PATENT DOCUMENTS

| 5,907,636 A | 5/1999 | Nakahara |
|---|---|---|
| 5,986,804 A | 11/1999 | Mashitani et al. |
| (Continued) | | |

FOREIGN PATENT DOCUMENTS

| EP | 2309463 A2 * | 4/2011 |
|---|---|---|
| JP | 10-215466 | 8/1998 |
| (Continued) | | |

OTHER PUBLICATIONS

U.S. Appl. No. 13/217,006, Non-Final Office Action, mailed May 18, 2012.

(Continued)

*Primary Examiner* — Mohammed Jebari
(74) *Attorney, Agent, or Firm* — Rutan & Tucker, LLP

(57) ABSTRACT

According to one embodiment, a basic format for a 3D signal having a first area to arrange main video data, a second area to arrange graphic data, a third area to arrange depth information of pixels of the main video data, and a fourth area to arrange depth information of pixels of the graphic data are defined. When depth information of pixels of the main video data is generated, a 3D processing module can select whether to use a first pattern obtained by inserting the graphic data into the main video data and a second pattern obtained by not inserting the graphic data into the main video data. A 3D related controller decides on the first or second pattern to be used by the 3D processing module.

5 Claims, 7 Drawing Sheets

(52) U.S. Cl.
CPC ... *H04N 13/0066* (2013.01); *H04N 21/23614* (2013.01); *H04N 21/816* (2013.01); *H04N 2213/003* (2013.01); *H04N 2213/005* (2013.01)

(56) References Cited

U.S. PATENT DOCUMENTS

| | | | |
|---|---|---|---|
| 2001/0009445 A1* | 7/2001 | Chung | 348/556 |
| 2001/0052935 A1 | 12/2001 | Yano | |
| 2005/0041736 A1* | 2/2005 | Butler-Smith | H04N 13/004 375/240.01 |
| 2010/0118119 A1 | 5/2010 | Newton et al. | |
| 2010/0150523 A1* | 6/2010 | Okubo et al. | 386/68 |
| 2010/0220175 A1 | 9/2010 | Claydon et al. | |
| 2010/0238267 A1* | 9/2010 | Izzat et al. | 348/43 |
| 2010/0265315 A1 | 10/2010 | Okuda et al. | |
| 2010/0289871 A1* | 11/2010 | Tatsuta et al. | 348/42 |
| 2010/0289960 A1 | 11/2010 | Rantalainen | |
| 2010/0295922 A1 | 11/2010 | Cheung et al. | |
| 2010/0315489 A1* | 12/2010 | Shepherd | H04N 13/0048 348/46 |
| 2011/0013890 A1* | 1/2011 | Sasaki et al. | 386/357 |
| 2011/0032333 A1 | 2/2011 | Neuman et al. | |
| 2011/0119709 A1* | 5/2011 | Kim et al. | 725/39 |
| 2011/0122131 A1* | 5/2011 | Bruls | H04N 13/0022 345/419 |
| 2011/0128351 A1 | 6/2011 | Newton et al. | |
| 2011/0188773 A1* | 8/2011 | Wei | G06K 9/40 382/260 |
| 2011/0200302 A1* | 8/2011 | Hattori et al. | 386/246 |
| 2011/0304691 A1* | 12/2011 | Newton | H04N 13/0018 348/43 |
| 2011/0310235 A1* | 12/2011 | Sasaki | H04N 13/0029 348/54 |
| 2012/0069146 A1* | 3/2012 | Lee | H04N 13/0048 348/43 |
| 2012/0146997 A1 | 6/2012 | Ishimaru et al. | |
| 2012/0281068 A1* | 11/2012 | Celia | H04N 13/0029 348/43 |
| 2013/0002656 A1* | 1/2013 | Zhang | 345/419 |
| 2013/0027514 A1* | 1/2013 | Cho et al. | 348/43 |

FOREIGN PATENT DOCUMENTS

| | | |
|---|---|---|
| JP | 2000-261828 | 9/2000 |
| JP | 2001-346226 | 12/2001 |
| JP | 2006-135747 | 5/2006 |
| JP | 2008-167310 | 7/2008 |
| JP | 2008-537160 | 9/2008 |
| WO | WO 2006097897 A1 | 9/2006 |

OTHER PUBLICATIONS

U.S. Appl. No. 13/217,006, Final Office Action, mailed Jan. 28, 2013.

* cited by examiner

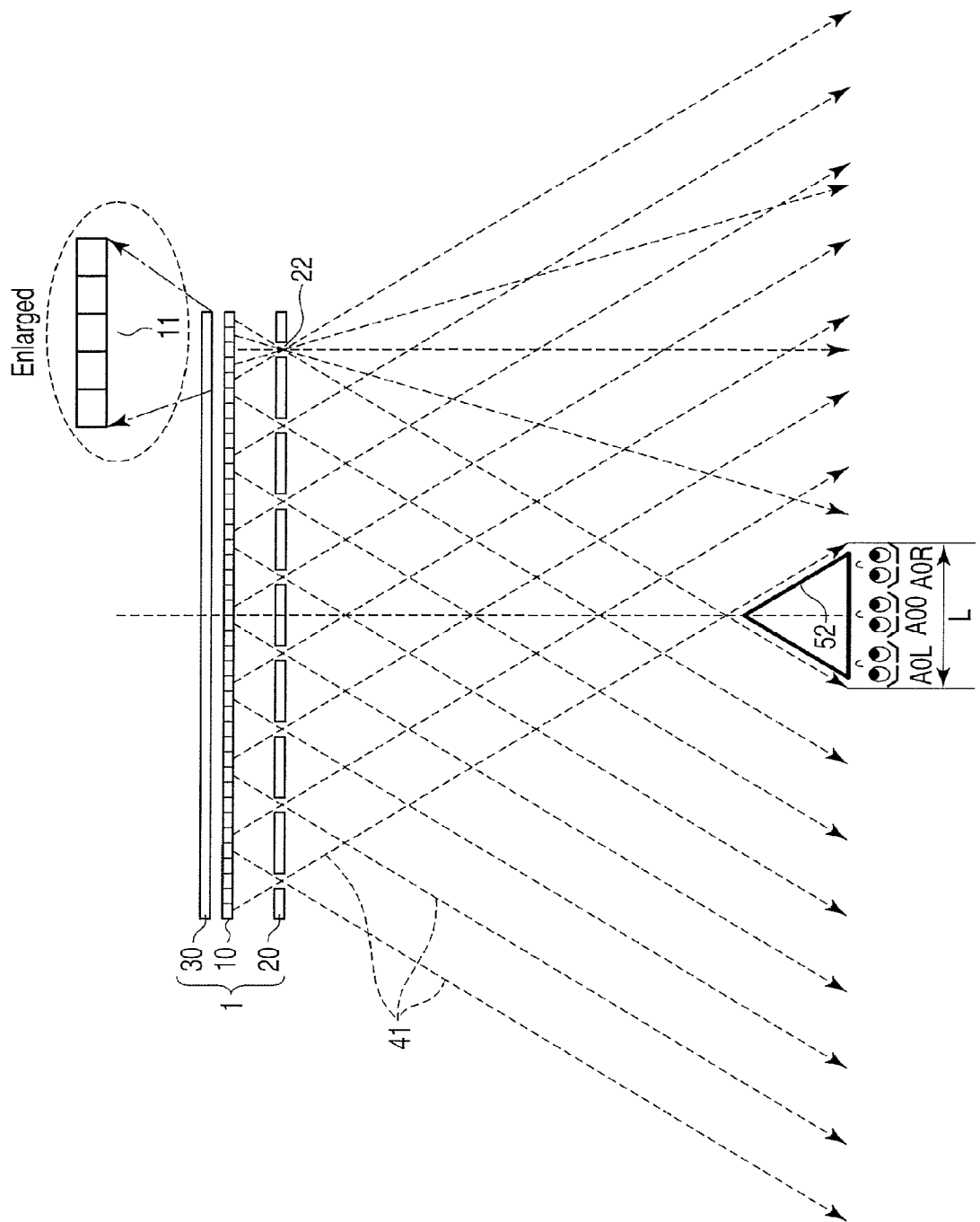
F I G. 2

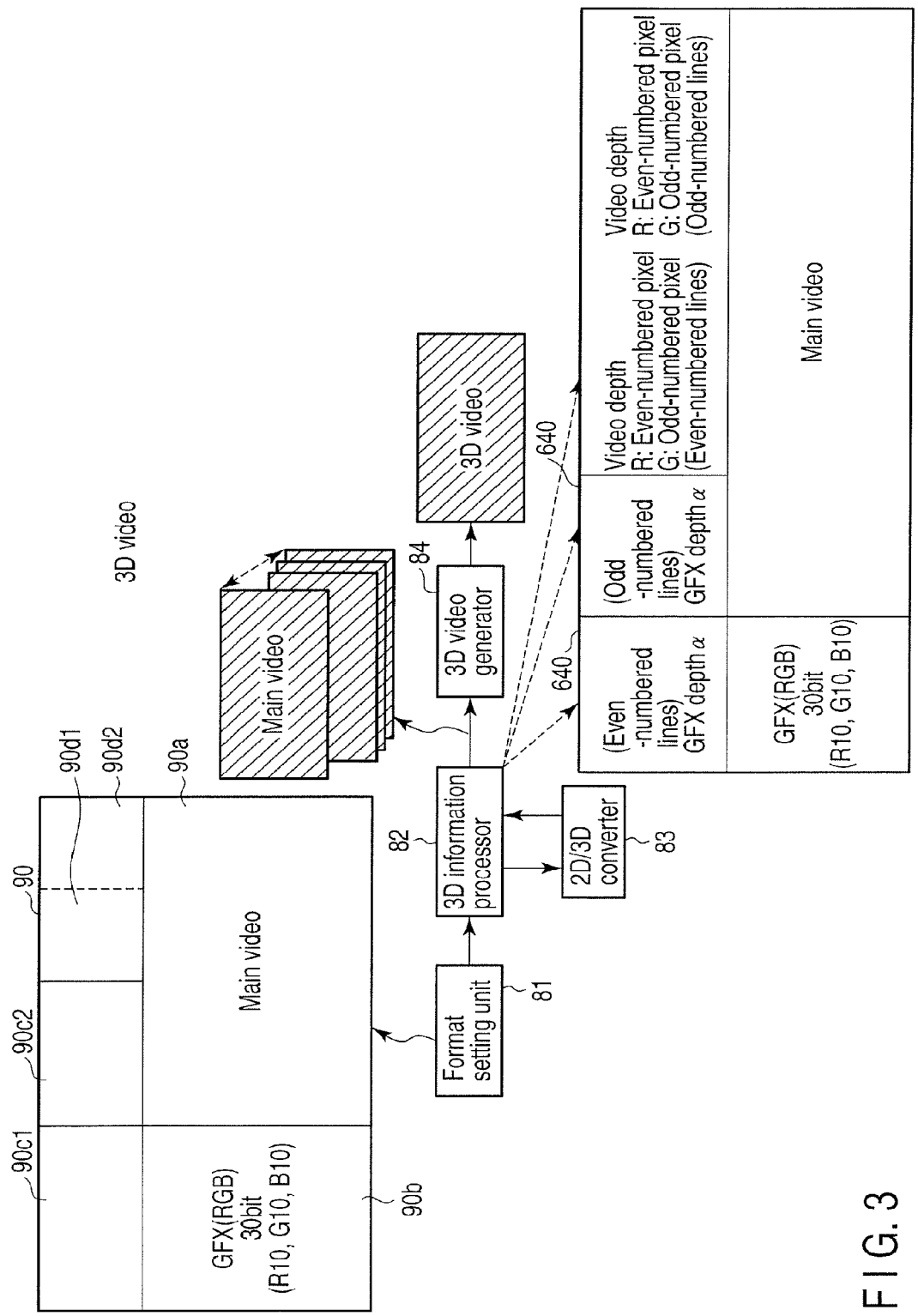
F I G. 3

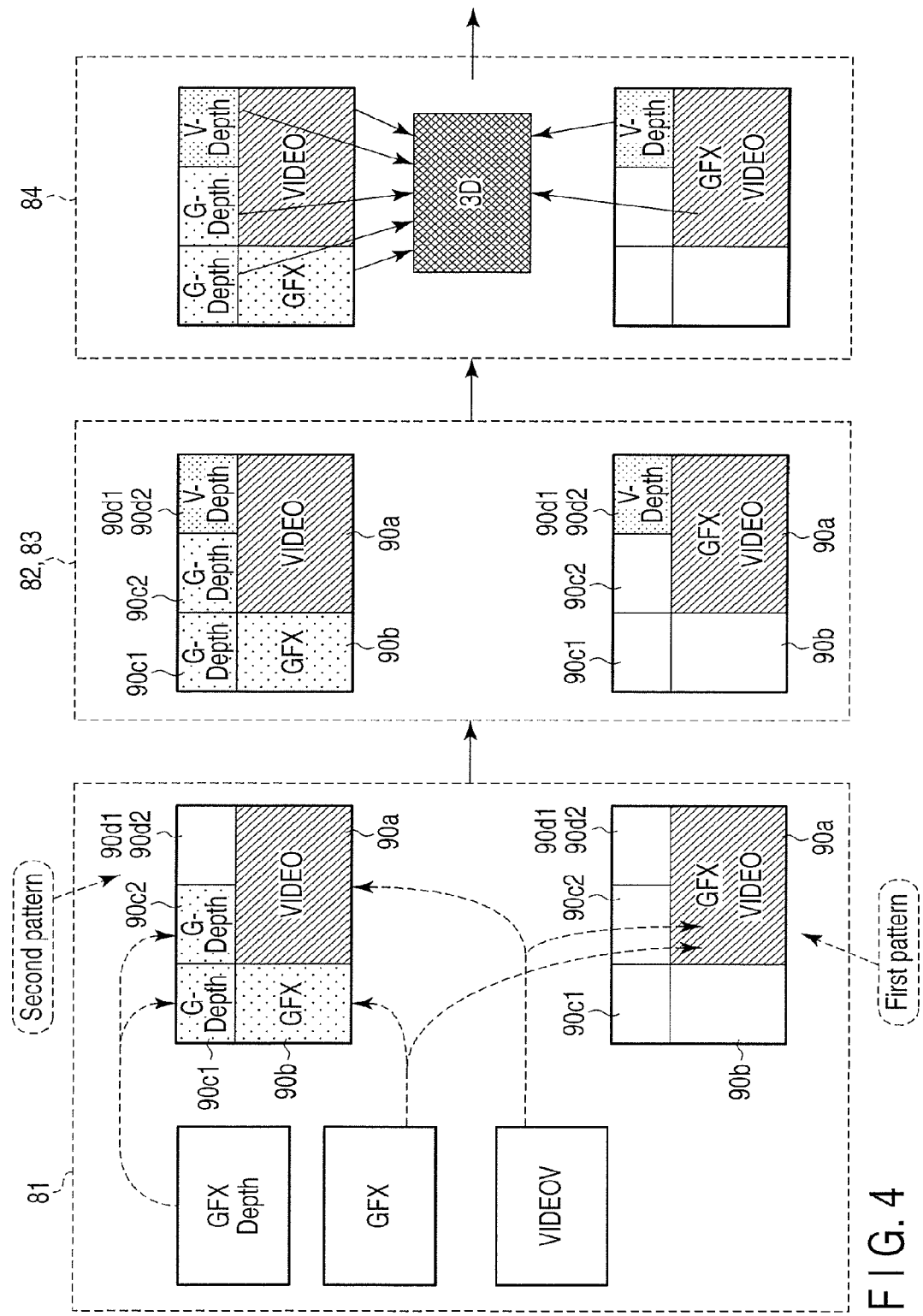
F I G. 4

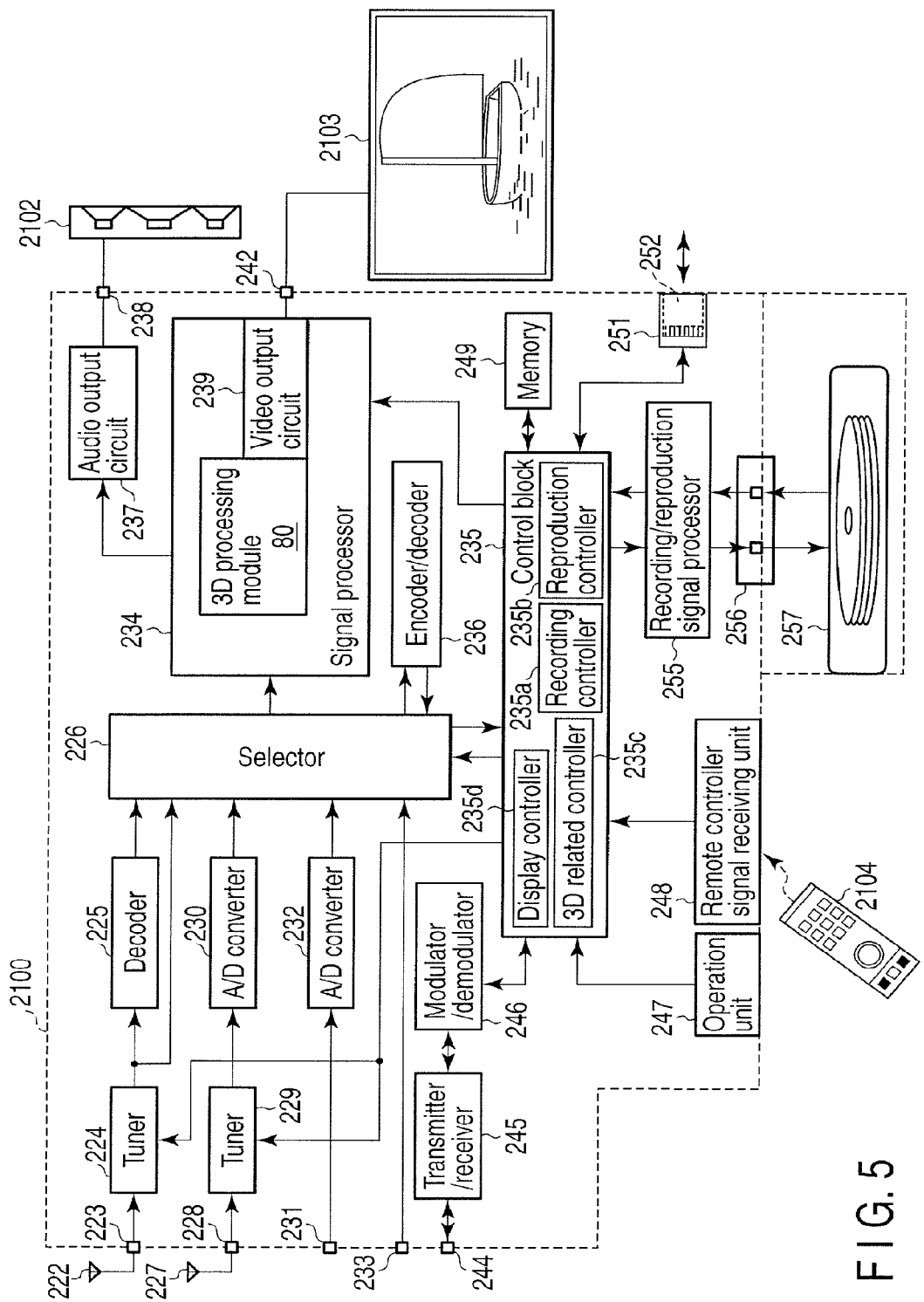
F I G. 5

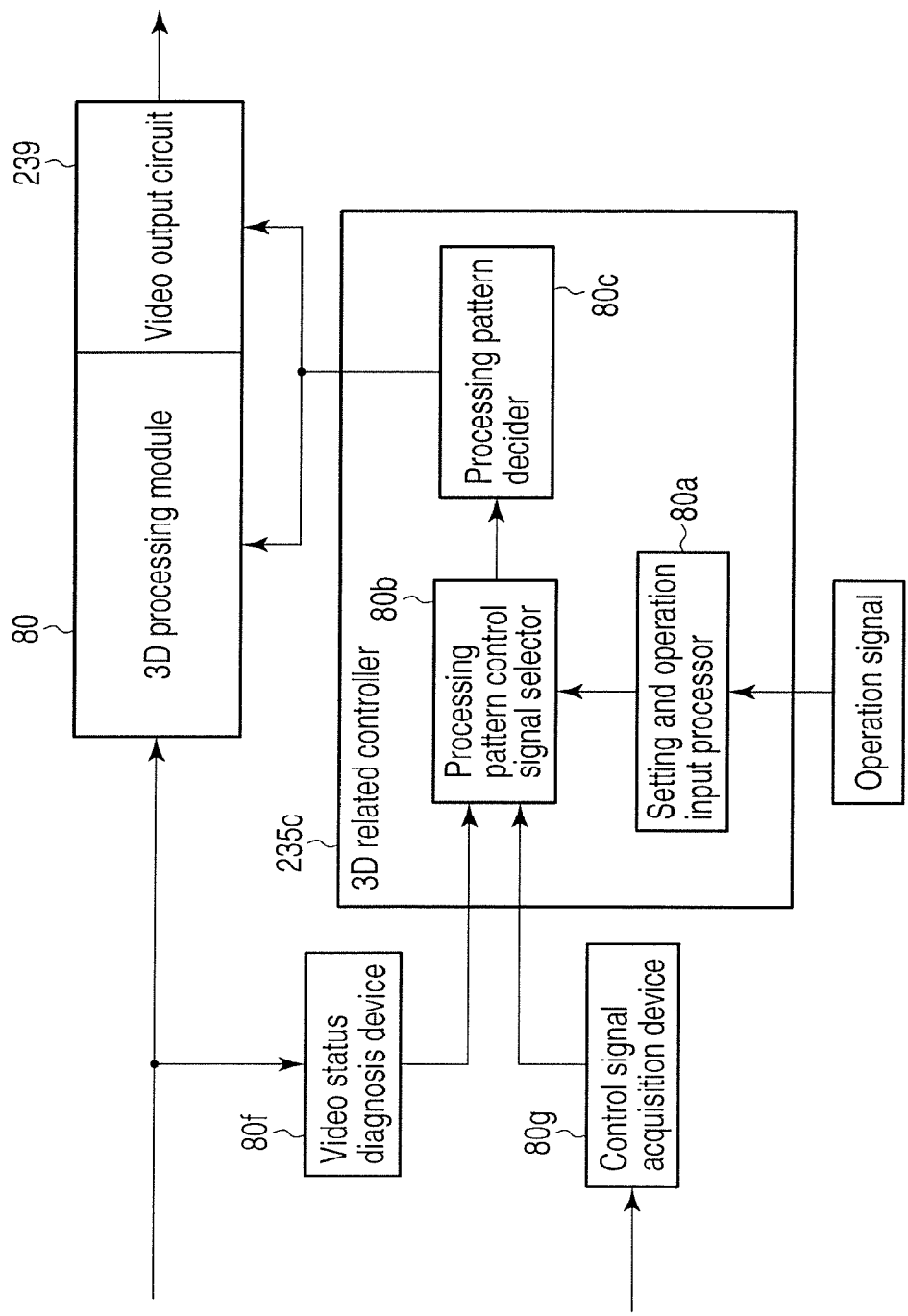
F I G. 6

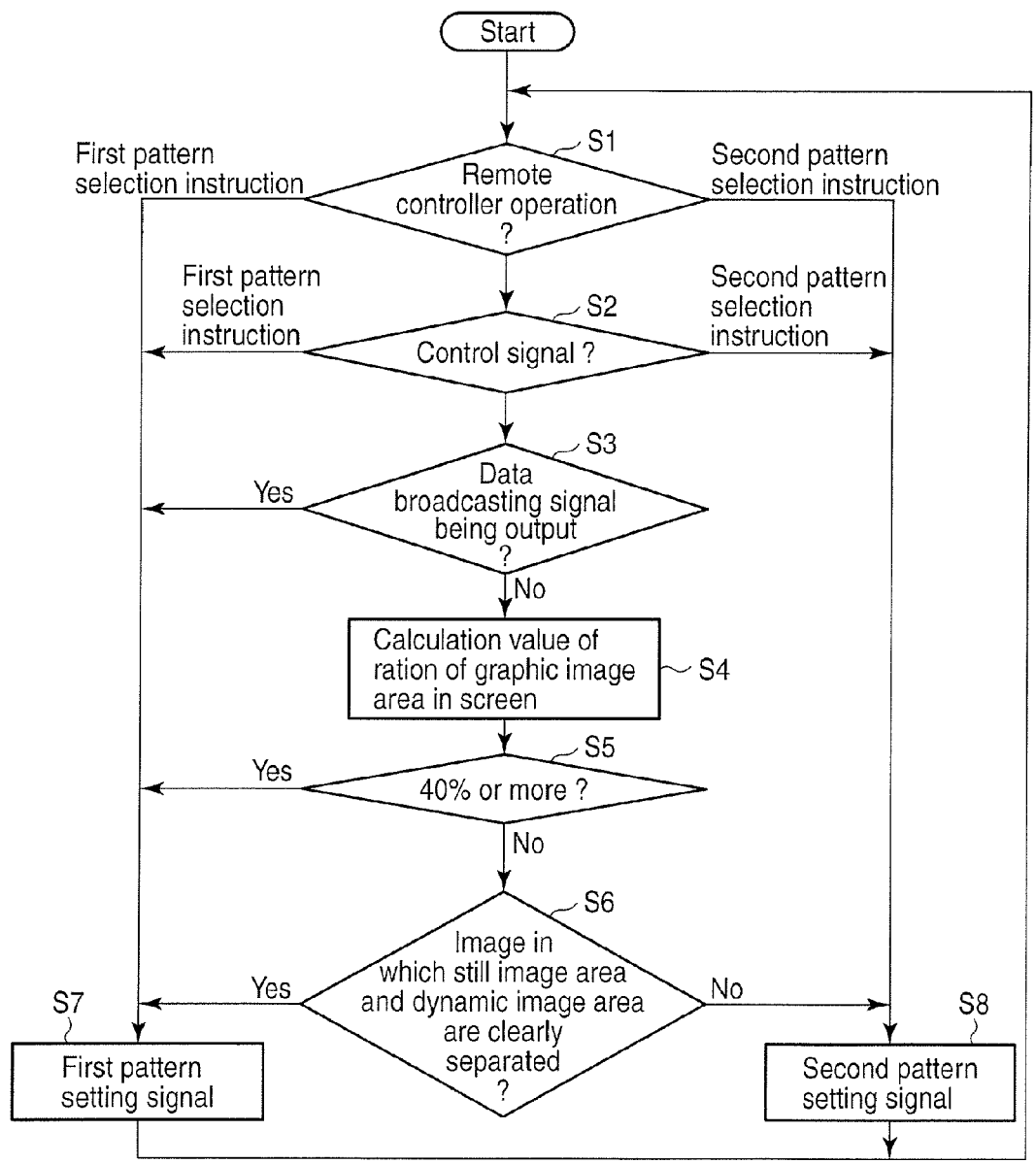
F I G. 7

STEREOSCOPIC VIDEO SIGNAL PROCESSING APPARATUS AND METHOD THEREOF

CROSS-REFERENCE TO RELATED APPLICATIONS

This application is a continuation of U.S. application Ser. No. 13/217,006, now abandoned, which is based upon and claims the benefit of priority from prior Japanese Patent Application No. 2010-278071, filed Dec. 14, 2010, the entire contents of which are incorporated herein by reference.

FIELD

Embodiments described herein relate generally to a stereoscopic video signal processing apparatus and a method therefore.

BACKGROUND

Stereoscopic video display technology of a glasses-less type capable of perceiving stereoscopic video without using special glasses can be classified in various ways. Such stereoscopic video display technology is generally classified into a binocular parallax method using a binocular parallax and a spatial image reproducing method that actually forms a spatial image.

The binocular parallax method is further classified into a twin type and a multi type. The twin type is a method by which an image for the left eye and an image for the right eye are made visible by the left eye and the right eye, respectively. The multi type is a method by which a range in which stereoscopic video is observable is broadened by using a plurality of observation positions when a video is shot to increase the amount of information.

The spatial image reproducing method is further classified into a holograph method and an integral photography method (hereinafter, called the integral method, but may also be called a ray reproducing method). The integral method may be classified as the binocular parallax method. According to the integral method, rays take quite opposite paths between shooting and reproducing video and thus, almost complete stereoscopic video is reproduced if the number of rays is made sufficiently large and the pixel size can be made sufficiently small. Thus, the ideal integral method is classified as the spatial image reproducing method.

Incidentally, to perceive stereoscopic video without glasses as in the multi type and the integral method, the configuration described below is normally adopted. A stereoscopic video display pixel arrangement is configured on a two-dimensional image display pixel arrangement. A mask (also called a ray control element) having a function to control rays from stereoscopic video display pixels is arranged on a front face side of the stereoscopic video display pixel arrangement. The mask is provided with window portions far smaller than stereoscopic video display pixels (typically as small as two-dimensional image display pixels) in positions corresponding to stereoscopic video display pixels.

A fly eye lens in which micro-lenses are arranged two-dimensionally, a lenticular seat in a shape in which optical openings extend linearly in the vertical direction and are periodically arranged in the horizontal direction, or slits are used as the mask.

According to such a configuration, element images displayed by individual stereoscopic video display pixels are partially blocked by the mask so that an observer visually recognizes only element images that have passed through window portions. Therefore, two-dimensional image display pixels visually recognized via some window portion can be made different from observation position to observation position so that stereoscopic video can be perceived without glasses.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary view showing the representative outline of another stereoscopic video display apparatus according to an embodiment;

FIG. 3 is an exemplary view showing a representative configuration example of a 3D processing module;

FIG. 4 is an exemplary view showing a representative example of progress of signal processing by the 3D processing module;

FIG. 5 is an exemplary view showing a representative overall configuration example of a TV set with which a stereoscopic video display apparatus is integrated;

FIG. 6 is an exemplary view showing a relationship between the 3D processing module and a 3D related controller in FIG. 5; and FIG. 7 is an exemplary flowchart shown to describe operation examples of blocks in FIG. 6.

DETAILED DESCRIPTION

Figure 1:
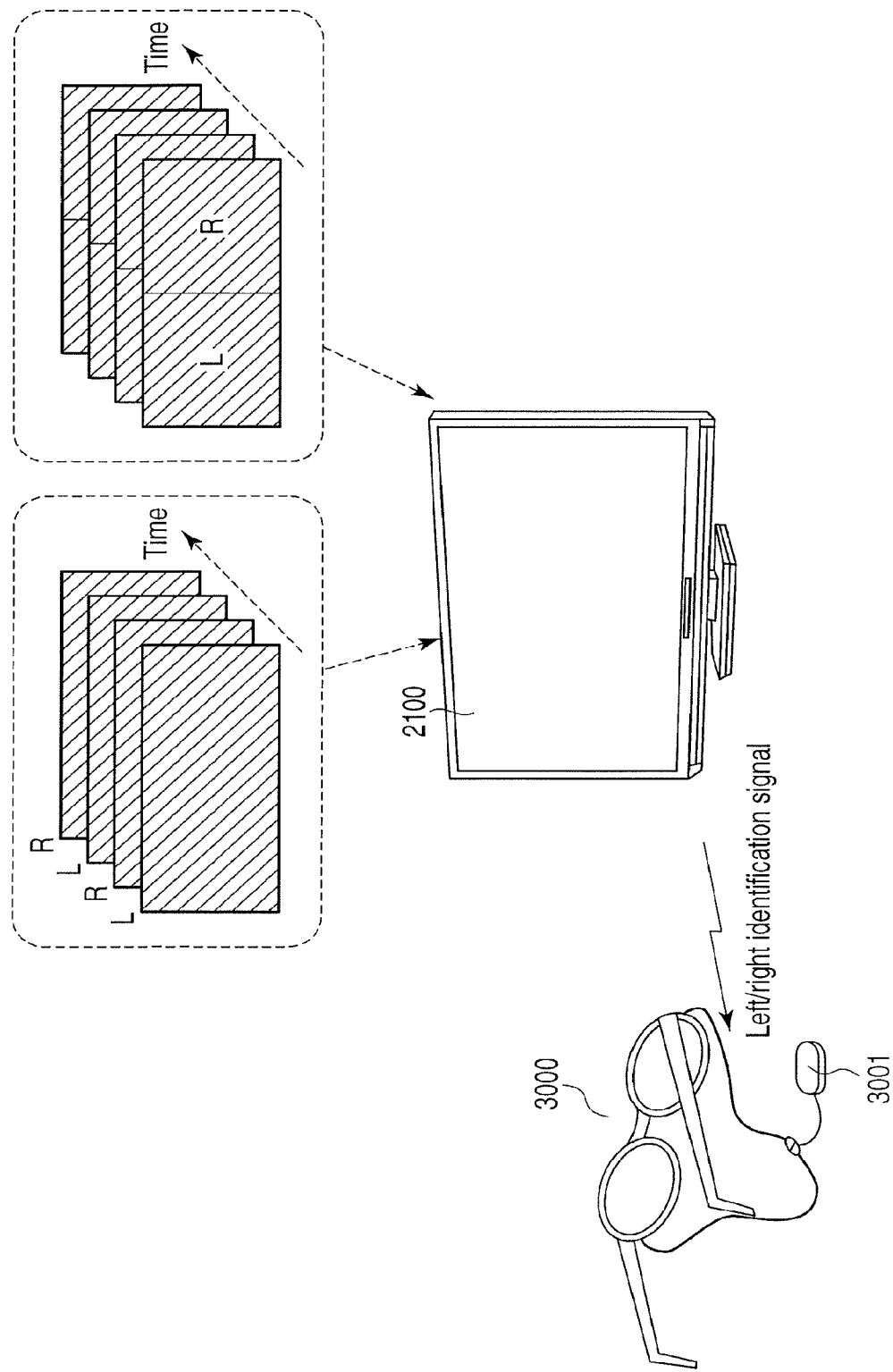
FIG. 1 is an exemplary view showing a representative outline of a stereoscopic video display apparatus according to an embodiment.

Various embodiments will be described hereinafter with reference to the accompanying drawings.

The present disclosure provides a stereoscopic video signal processing apparatus and a method therefore capable of adaptively processing video of graphic data to increase commercial value and adapting to various systems.

In general, according to one embodiment, a basic format for a 3D signal having a first area to arrange main video data, a second area to arrange graphic data, a third area to arrange depth information of pixels of the main video data, and a fourth area to arrange depth information of pixels of the graphic data is defined. When depth information of pixels of the main video data is generated, a 3D processing module can select whether to use a first pattern obtained by inserting the graphic data into the main video data and a second pattern obtained by not inserting the graphic data into the main video data. A 3D related controller decides on the first or second pattern to be used by the 3D processing module.

An embodiment will further be described with reference to the drawings. First, the principle of a stereoscopic video display will be described. FIG. 1 is an example of a stereoscopic video display apparatus of the twin type in which stereoscopic video can be observed by using glasses, and FIG. 2 is an example of a stereoscopic video display apparatus of the glasses-less type in which stereoscopic video can be observed without glasses.

In FIG. 1, two twin types are shown simultaneously.

The first type is an example in which a left eye video (L) and a right eye video (R) are alternately displayed for each frame in a TV set 2100. A signal of the left eye video (L) and a signal of the right eye video (R) may be either sent from outside or generated as a dummy signal from a 2D display video signal inside the TV set.

Identification information indicating which of the left eye video and the right eye video is the currently displayed video is output from the TV set 2100. A transfer medium of left/right identification information may be a wire, radio wave, or infrared ray. 3D glasses 3000 have a receiver 3001, which receives identification information and controls a shutter operation of left and right liquid crystal glasses to synchronize the shutter operation to the displayed left/right video. Accordingly, a viewer can perceive stereoscopic video by observing the right eye video with the right eye and the left eye video with the left eye.

The second type is an example in which the left eye video (L) arranged in a left half of a frame and the right eye video (R) arranged in a right half of the frame are displayed in the TV set 2100. Also, a signal of the left eye video (L) and a signal of the right eye video (R) may be either sent from outside or generated as a dummy signal from a 2D display video signal inside the TV set. This method may be called a side-by-side method. Outgoing light by left video and outgoing light by right video are different in polarization direction and polarizing glasses are used as the 3D glasses 3000. Left and right glasses have polarization properties, the left glass allows the left video to pass, and the right glass allows the right video to pass. Accordingly, the viewer can perceive stereoscopic video by observing the right eye video with the right eye and the left eye video with the left eye. Further, various other stereoscopic video display methods are known, but a description thereof is omitted.

FIG. 2 is a sectional view schematically showing an example of the stereoscopic video display apparatus according to an embodiment.

A stereoscopic video display apparatus 1 shown in FIG. 2 is of the glasses-less type and includes a display unit 10 including many stereoscopic video display pixels 11 arranged horizontally and vertically and a mask 20 separated from the stereoscopic video display pixels 11 and provided with many window portions 22 corresponding to the stereoscopic video display pixels 11.

The mask 20 includes optical openings and has a function to control rays from the pixels. The mask 20 is also called a parallax barrier or ray control element. A transparent substrate having formed thereon a light-shielding body pattern with many openings corresponding to the many window portions 22 or a light-shielding plate provided with many through-holes corresponding to the many window portions 22 can be used as the mask 20. Alternatively, a fly eye lens in which many micro-lenses are arranged two-dimensionally or a lenticular seat in a shape in which optical openings extend linearly in the vertical direction and are periodically arranged in the horizontal direction can also be used as other examples of the mask 20. Further, a transmission type liquid crystal display unit in which the arrangement, dimensions, shape and the like of the window portion 22 are freely changeable can be used as the mask 20.

For stereoscopic vision of a still image, the stereoscopic video display pixels 11 may be paper on which an image is printed. However, for stereoscopic vision of dynamic images, the stereoscopic video display pixels 11 are realized by using a liquid crystal display unit. Many pixels of the transmission type liquid crystal display unit 10 constitute the many stereoscopic video display pixels 11 and a backlight 30 serving as a surface light source is arranged on the back face side of the liquid crystal display unit 10. The mask 20 is arranged on the front face side of the liquid crystal display unit 10.

When the transmission type liquid crystal display unit 10 is used, the mask 20 may be arranged between the backlight 30 and the liquid crystal display unit 10. Instead of the liquid crystal display unit 10 and the backlight 30, a self-light emitting display apparatus such as an organic EL (electroluminescence) display apparatus, cathode ray tube, and plasma display apparatus may be used. In such a case, the mask 20 is arranged on the front face side of the self-light emitting display apparatus.

FIG. 2 schematically shows a relationship between the stereoscopic video display apparatus 1 and observation positions A00, A0R, and A0L.

The observation position is a position after moving in a horizontal direction of a display screen while maintaining the distance to the screen (or the mask) constant. This example shows a case where one stereoscopic video display pixel 11 is constituted of a plurality of (for example, five) two-dimensional display pixels. The number of pixels is only an example and may be less than five (for example, two) or more (for example, nine).

In FIG. 2, a broken line 41 is a straight line (ray) linking the center of a single pixel positioned in the boundary between the adjacent stereoscopic video display pixels 11 and the window portion 22 of the mask 20. In FIG. 2, an area of a thick line 52 is an area in which true stereoscopic video (original stereoscopic video) is perceived. The observation positions A00, A0R, and A0L are positioned within the area of the thick lines 52. An observation position in which only true stereoscopic video is perceived will be called a "viewing area" below.

FIG. 3 shows an example of a 3D processing module 80 that converts a 2D video display signal into a 3D video display signal. The 3D processing module 80 receives a twin 3D video display signal in which, for example, a 2D video display signal for the left eye is arranged in a left area and a 2D video display signal for the right eye is arranged in a right area.

The 3D processing module 80 converts one of 2D video display signals of a twin 3D video display signal into a glasses-less type 3D video display signal. That is, the 3D processing module 80 forms a 2D video display signal into a 3D signal format. If a 3D signal is input, the signal can be adopted unchanged. The 3D signal format can contain a 2D digital input video signal (main video data) and graphics such as OSD and other data simultaneously.

After being 3D-formatted by a format setting unit 81, the 2D digital input video signal is input into a 3D information processor 82. The 3D information processor 82 extracts main video data and sends the extracted video data to a 2D/3D converter 83. The 2D/3D converter 83 generates depth information (this information, which may also be called length information, is assumed to contain parallax information) for each pixel of the main video data. The 3D information processor 82 uses information of the 3D signal format generated by the format setting unit 81 and the depth information of the main video data generated by the 2D/3D converter 83 to generate a plurality of (for example, nine) video planes for 3D configuration. The depth information for each pixel of graphic data may be preset to the format setting unit 81.

The plurality of video planes for 3D configuration and the depth information are input into a 3D video generator 84 for conversion into a 3D video display signal (stereoscopic video display signal). The 3D video display signal becomes a pattern signal that drives stereoscopic video display pixels shown in FIG. 2.

The 3D signal format includes an area 90*a* to arrange main video data, an area 90*b* to arrange graphic data (including R, G, and B pixels), an area 90*c*1 to arrange depth information of pixels of even-numbered lines of the graphic data and an α value, an area 90*c*2 to arrange depth information of pixels of odd-numbered lines of the graphic data, an area 90*d*1 to arrange depth information of pixels of even-numbered lines of the main video data and the α value, and an area 90*d*2 to arrange depth information of pixels of odd-numbered lines of the main video data. Depth information of pixels of the main video data contains depth information about even-numbered pixels and odd-numbered pixels. The α value is α value indicating the degree of overlapping with pixels of graphic data.

The area 90*a* of main video data has, for example, 1280 pixels×720 lines, the area 90*b* has 640 pixels×720 lines, the area 90*c*1 has 640 pixels×360 lines, the area 90*c*2 has 640 pixels×360 lines, the area 90*d*1 has 320 pixels×360 lines, and the area 90*d*2 has 320 pixels×360 lines.

The other areas 90*c*1, 90*c*2, 90*d*1, 90*d*2 than the areas 90*a*, 90*b* of main video data and graphic data may be called control information areas. Control information is generated by the 3D information processor 82 and the 2D/3D converter 83 and arranged in predetermined areas.

FIG. 4 shows processing progress of signals processed inside the 3D processing module 80 (that is, the format setting unit 81, the 3D information processor 82, the 2D/3D converter 83, and the 3D video generator 84) in FIG. 3.

First in the format setting unit 81, one of the first pattern and the second pattern is prepared, or both may be prepared.

The first pattern is a pattern obtained by inserting graphic data GFX into main video data VIDEO in the first area 90*a*. The second area 90*b* of the first pattern may be blank or the graphic data GFX may be arranged therein. The third areas 90*c*1, 90*c*2 may be blank or depth information of the graphic data GFX may be arranged therein. The fourth areas 90*d*1, 90*d*2 are blank in this stage.

The second pattern is a pattern obtained by not inserting the graphic data GFX into the main video data VIDEO. The second area 90*b* of the second pattern has the graphic data GFX arranged therein. The third areas 90*c*1, 90*c*2 has depth information of the graphic data GFX arranged therein. The fourth areas 90*d*1, 90*d*2 are blank in this stage.

Being blank means having data of all zeros or all "F."

After a 3D signal of the first pattern or the second pattern is adopted, the 3D information processor 82 and the 2D/3D converter 83 break down the 3D signal into a plurality of (for example, nine) video planes for 3D configuration. Here, information of each pixel of main video data is mainly generated. Depth information of odd-numbered lines and depth information of even-numbered lines of main video data are arranged in the area 90*d*1 and the area 90*d*2, respectively.

When a 3D signal of the first pattern is processed, graphic data at a resolution similar to the resolution of main video data can be used. However, due to an influence of adjustments of the main video data, depth information of the graphic data may become unstable. That is, the depth of graphics may become unstable. Adjustments of the main video data include, for example, the gamma adjustment, brightness adjustment, and color adjustment. If these adjustments are made, the graphic data contained in the main video data may be affected by main video data adjustments.

The processing time needed to obtain depth information of main video data directly manifests itself as a delay time of display output of graphic data. Thus, if an image of the graphic data is, for example, a graphic user interface to operate a remote controller, it is necessary to consider the delay time when an operation of the remote controller is performed.

The 3D signal of the first pattern described above is effective in cases where video is characterized by a large portion of still images or an area of still images and an area of dynamic images are clearly separated in the screen. Videos with a large portion of still images include, for example, a video of a program guide and a video acquired from data broadcasting. Videos in which an area of still images and an area of dynamic images are clearly separated include, for example, a video in which an area of subtitles for a movie is set.

When a 3D signal of the second pattern is processed, the graphic data GFX is arranged in the dedicated second area 90*b*. Thus, adjustments of main video data do not affect graphic data and depth information of graphic data does not become unstable.

While processing to obtain depth information of main video data is performed, the latest graphic data GFX may independently be arranged in the second area 90*b* and depth information of the graphic data GFX in third areas 90*c*1, 90*c*2. Thus, if an image of graphic data is, for example, a graphic user interface to operate the remote controller, a delay time is not involved when an operation of the remote controller is performed. For example, when a game operation is performed with respect to a game video using the remote controller, the second pattern is effective.

A 3D signal of the first pattern or the second pattern is input into the 3D video generator 84 for conversion into a 3D video display signal (stereoscopic video display signal). The 3D video display signal becomes a pattern signal that drives stereoscopic video display pixels shown in FIG. 2. That is, a pixel signal in accordance with depth information is generated.

Which of the 3D signal of the first pattern and the 3D signal of the second pattern described above to adopt is decided by a 3D related controller 235*c* (see FIGS. 5 and 6) described later.

According to the above embodiment, a basic format for a 3D signal having a first area to arrange main video data, a second area to arrange graphic data, a third area to arrange depth information of pixels of the main video data, and a fourth area to arrange depth information of pixels of the graphic data is defined. When generating depth information of pixels of the first area, the 3D processing module 80 can select whether to use the first pattern obtained by inserting the graphic data into the main video data or the second pattern obtained by not inserting the graphic data into the main video data. A 3D related controller decides on one of the first and second patterns used by the 3D processing module. Accordingly, an appropriate pattern in accordance with video characteristics can be selected.

In the above description, FIGS. 3 and 4 are described as the 3D processing module 80 that converts a 2D video display signal into a 3D video display signal. However, a complete version of the 3D video display signal (data already arranged in each area) shown in FIG. 3 may be input from outside. The present embodiment includes the reconfiguration in such a case of a 3D signal of the first pattern or the second pattern described in FIG. 4 by breaking down a signal in necessary areas. Therefore, the present embodiment can flexibly handle input 3D signals of different methods. If, for example, a signal by the side-by-side method is input, a frame of one side can be used. If video for the left eye and video for the right eye are alternately input for each frame, only the frame of one side may be adopted.

FIG. 5 schematically shows a signal processing system of the TV set 2100, which is an example of an apparatus to which the embodiment is applied. A digital TV broadcasting signal received by an antenna 222 for receiving digital TV broadcasting is supplied to a tuner 224 via an input terminal 223. The tuner 224 tunes in to and demodulates a signal of the desired channel from the input digital TV broadcasting signal. A signal output from the tuner 224 is supplied to a decoder 225 where decode processing according to, for example, the MPEG (moving picture experts group) 2 method is performed before being supplied to a selector 226.

Output from the tuner 224 is also supplied to the selector 226 directly. Video/audio information is separated by the selector 226 so that the video/audio information can be processed by a recording/reproduction signal processor 255 via a control block 235. A signal processed by the recording/reproduction signal processor 255 can be recorded in a hard disk drive (HDD) 257. The HDD 257 is connected as a unit to the recording/reproduction signal processor 255 via a terminal 256 and can be replaced. The HDD 257 contains a recorder and a reader of a signal.

An analog TV broadcasting signal received by an antenna 227 for analog TV broadcasting is supplied to a tuner 229 via an input terminal 228. The tuner 229 tunes in to and demodulates a signal of the desired channel from the input analog TV broadcasting signal. Then, a signal output from the tuner 229 is digitized by an A/D (analog/digital) converter 230 before being output to the selector 226.

Analog video and audio signals supplied to an input terminal 231 for an analog signal to which, for example, devices such as a VTR are connected are supplied to an A/D converter 232 for digitalization and then output to the selector 226. Further, digital video and audio signals supplied to an input terminal 233 for a digital signal connected to an external device such as an optical disk or magnetic recording medium reproduction apparatus via, for example, HDMI (High Definition Multimedia Interface) are supplied to the selector 226 unchanged.

When an A/D converted signal is recorded in the HDD 257, compression processing based on a predetermined format, for example, the MPEG (moving picture experts group) 2 method is performed on the A/D converted signal by an encoder in an encoder/decoder 236 accompanying the selector 226 before the A/D converted signal is recorded in the HDD 257 via the recording/reproduction signal processor 255. When the recording/reproduction signal processor 255 records information in the HDD 257 in cooperation with a recording controller 235a, for example, what kind of information to record in which directory of the HDD 257 is pre-programmed. Thus, conditions when a stream file is stored in a stream directory and conditions when identification information is stored in a recording list file are set.

The selector 226 selects one pair from four types of input digital video and audio signals to supply the pair to a signal processor 234. The signal processor 234 separates audio information and video information from the input digital video signal and performs predetermined signal processing thereon. Audio decoding, tone adjustment, mix processing and the like are arbitrarily performed as the signal processing on the audio information. Color/brightness separation processing, color adjustment processing, image quality adjustment processing and the like are performed on the video information.

The 3D processing module 80 described above is contained in the signal processor 234. A video output unit 239 switches to 3D signal output or 2D signal output in accordance with 3D/2D switching. The video output unit 239 includes a synthesis unit that multiplexes graphic video, video of characters, figures, symbols and the like, user interface video, video of a program guide and the like from the control block 235 onto main video. The video output unit 239 may contain a scanning line number conversion.

Audio information is converted into an analog form by an audio output circuit 237 and the volume, channel balance and the like thereof are adjusted before being output to a speaker apparatus 2102 via an output terminal 238.

Video information undergoes synthesis processing of pixels, the scanning line number conversion and the like in the video output unit 239 before being output to a display apparatus 2103 via an output terminal 242. As the display apparatus 2103, for example, the apparatus described in FIG. 2 is adopted.

Various kinds of operations including various receiving operations of the TV set 2100 are controlled by the control block 235 in a unified manner. The control block 235 is a set of microprocessors incorporating CPUs (central processing units). The control block 235 controls each of various blocks so that operation information from an operation unit 247 or operation information transmitted from a remote controller 2104 is acquired by a remote controller signal receiving unit 248 whereby operation content thereof is reflected.

The control block 235 uses a memory 249. The memory 249 mainly includes a ROM (read only memory) storing a control program executed by a CPU thereof, a RAM (random access memory) to provide a work area to the CPU, a nonvolatile memory in which various kinds of setting information and control information are stored.

The apparatus can perform communication with an external server via the Internet. A downstream signal from a connection terminal 244 is demodulated by transmitter/receiver 245 and demodulated by a modulator/demodulator 246 before being input into the control block 235. An upstream signal is modulated by the modulator/demodulator 246 and converted into a transmission signal by the transmitter/receiver 245 before being output to the connection terminal 244.

The control block 235 can perform conversion processing on dynamic images or service information downloaded from an external server to supply the converted images or information to the video output unit 239. The control block 235 can also transmit a service request signal to an external server in response to a remote controller operation.

Further, the control block 235 can read data in a card type memory 252 mounted on a connector 251. Thus, the present apparatus can read, for example, photo image data from the card type memory 252 to display the photo image data in the display apparatus 2103. When special color adjustments are made, image data from the card type memory 252 can be used as standard data or reference data.

In the above apparatus, a user views a desired program of a digital TV broadcasting signal and also selects a program by operating the remote controller 2104 to control the tuner 224 if the user wants to save the program in the HDD 257.

Output of the tuner 224 is decoded by the decoder 225 into a base-band video signal and the base-band video signal is input into the signal processor 234 from the selector 226. Accordingly, the user can view the desired program in the display apparatus 2103.

A stream (including many packets) of the selected program is input into the control block 235 via the selector 226.

If the user performs a recording operation, the recording controller 235a selects the stream of the program and supplies the stream to the recording/reproduction signal processor 255. For example, a file number is attached to the stream of the selected program and the stream is stored in a file directory of the HDD 257 as a stream file by the operations of the recording controller 235a and the recording/reproduction signal processor 255.

If the user wants to reproduce and view the stream file recorded in the HDD 257, the user operates, for example, the remote controller 2104 to specify the display of, for example, a recording list file.

The recording list file has a table of a file number and a file name (called identification information) indicating what kinds of stream files are recorded in the HDD 257. If the user specifies the display of the recording list file, a recording list is displayed as a menu and the user moves the cursor to a desired program name or file number in the displayed list before operating the Decision button. Then, the reproduction of the desired stream file is started.

The specified stream file is read from the HDD 257 under the control of a reproduction controller 235b and decoded by the recording/reproduction signal processor 255 before being input into the signal processor 234 via the control block 235 and the selector 226.

The control block 235 includes a recording controller 235a, a reproduction controller 235b, and a 3D related controller 235c.

FIG. 6 picks up and shows a relationship between the 3D related controller 235c, and the 3D processing module 80 and the video output unit 239. The 3D related controller 235c includes a setting and operation input processor 80a, a processing pattern control signal selector 80b, and a processing pattern decider 80c. The processing pattern control signal selector 80b outputs a control signal to decide on the first pattern or the second pattern described above in accordance with operation input to supply the control signal to the processing pattern decider 80c. The processing pattern decider 80c can decide the processing pattern in the 3D processing module 80 in favor of the first or second processing pattern in accordance with the input signal.

Various methods to set or switch the processing pattern are set. The first method is used when an operation signal by a user operation of the remote controller is input. The user can forcibly set one of the first and second processing patterns. If the user does not perform operation input (or if the user operates, for example, a processing pattern cancellation button), the processing pattern control signal selector 80b determines a processing pattern control signal in response to a diagnosis signal from a video status diagnosis device 80f or a control signal from a control signal acquisition device 80g.

The video status diagnosis device 80f analyzes an input 2D video display signal to determine whether, for example,
 (1) a data broadcasting signal is being output, and
 (2) by calculating a ratio of a graphic image area in the screen, the ratio is, for example, 40% or more of the screen. Further,
 (3) the video status diagnosis device 80f determines whether a still image area (for example, an area of subtitles) and a dynamic image area (for example, an area of movies) are clearly separated in the input 2D video display signal.

The control signal acquisition device 80g determines whether a control signal accompanying the input 2D video display signal specifies any processing pattern.

FIG. 7 shows an example of a procedure for deciding on the first or second pattern to be used in the block configuration in FIG. 6. This procedure is only an example and does not limit the present invention. First, the user can forcibly select a desired pattern by a remote controller operation (step S1). If there is no remote controller operation, that is, the remote controller is in non-selection mode, a control signal is determined (step S2). The control signal is, for example, a specifying signal transmitted together with main video data and specifies one of the first pattern and the second pattern. The specifying signal is provided by, for example, a content provider to content of the main video data in advance.

If there is no specifying signal, it is determined whether the signal currently being processed is a data broadcasting signal (step S3). If a data broadcasting signal is processed and output, a control signal selecting the first pattern is output and a first pattern setting signal is obtained (step S7). If no data broadcasting signal is processed or output, the ratio of a graphic image area to one screen of a display is calculated (step S4). If the ratio of a graphic image area to one screen is, for example, 40% or more (step S5), a first pattern setting signal is obtained (step S7). 40% is not restrictive and may be changed. If the ratio of a graphic image area to one screen is, for example, less than 40%, it is determined whether a still image area and a dynamic image area are clearly separated (step S6). If both areas are clearly separated, a first pattern setting signal is obtained (step S7). Accordingly, when a subtitle area is fixed as in a movie, subtitle characters can be displayed at high resolution. If a still image area and a dynamic image area are not clearly separated, a second pattern setting signal is obtained (step S8). In the above flow, the order of determination portions may be interchanged and such an interchanged procedure is also included in the scope of the present invention.

According to the present embodiment, as described above, the first pattern or the second pattern is selected in accordance with characteristics of graphic data and main video data to convert a 2D video display signal into a 3D video display signal. Thus, appropriate 2D/3D conversion processing can be realized for various input video signals. When the first pattern is adopted, video of high-resolution graphic data can be transmitted efficiently. That is, video of graphic data can adaptively be processed to increase commercial value.

In the above embodiments, the module is used as a name of some blocks. However, the module is not limited in the scope of the invention. It may be used block, unit, processor, circuit and combination of these terms instead of the module.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic video signal processing apparatus, wherein a three-dimensional (3D) signal format is defined in one rectangular frame comprising pixels of 1920×1080, the one rectangular frame comprising a first area comprising pixels of 1280×720 to arrange first data relating to a part of source video data, a second area comprising pixels in total of 1280×720 to arrange second data relating to another part of the source video data and being usable to provide depth information regarding the part of the source video data, the apparatus comprising:
- a first processor configured to prepare, as the 3D signal format, a pattern obtained from data of the first area and the second area, the second area being divided into a first rectangular subarea comprising pixels of 640×720, a second rectangular subarea comprising pixels of 640×360, and a third rectangular subarea comprising pixels of 640×360, the first rectangular subarea, the second rectangular subarea and the third rectangular subarea being configured to include different portions of data of the source video data and at least one of the first, second or third rectangular subareas being arranged non-linear to at least a different one of the first, second or third rectangular subareas;
- a second processor communicatively coupled to at least the first processor, the second processor comprises a converter to generate the depth information including depth information for each pixel of the first data and a processor that uses the data of the 3D signal format prepared by the first processor and the depth information prepared by the converter to generate a plurality of video planes for 3D conversion that are at least part of the data of the 3D signal format, and
- a third processor communicatively coupled to at least the second processor, the third processor being configured to receive the depth information and the data of the 3D signal format for 3D configuration, and to generate a 3D video display signal.

2. A stereoscopic video signal processing method used by a three-dimensional (3D) signal processor, wherein a 3D signal format is defined in one rectangular frame comprising pixels of 1920×1080, the one rectangular frame comprising a first rectangular area comprising pixels of 1280×720 to arrange first data relating to a part of source video data, a second area comprising pixels in total of 1280×720 to arrange second data relating to another part of the source video data and being usable to provide depth information regarding the part of the source video data, the method comprising:

- preparing, as the 3D signal format, a pattern obtained from data of the first area and the second area, the second area being divided into a first rectangular subarea comprising pixels of 640×720, a second rectangular subarea comprising pixels of 640×360, and a third rectangular subarea comprising pixels of 640×360, the first rectangular subarea, the second rectangular subarea and the third rectangular subarea being configured to include different portions of data of the source video data and at least one of the first, second or third rectangular subareas being arranged non-linear to at least a different one of the first, second or third rectangular subareas;
- generating, by a converter, the depth information by using data in the prepared 3D signal format, the depth information includes depth information for each pixel of the first data;
- generating, by a processor, a plurality of video planes for 3D conversion using at least part of the data of the 3D signal format and the depth information prepared by the converter, and
- receiving the depth information and the data of the 3D signal format for 3D configuration to generate a 3D video display signal.

3. The stereoscopic video signal processing apparatus of claim 1, wherein the first processor comprises a format setting unit, the second processor comprises a 3D information processor and a two-dimensional to three-dimensional (2D/3D) converter, and the third processor comprises a 3D video generator.

4. The stereoscopic video signal processing apparatus of claim 1, wherein the first processor, the second processor and the third processor are integrated as part of a signal processor.

5. The stereoscopic video signal processing apparatus of claim 4 further comprising:
- a video output unit communicatively coupled to the signal processor,
- wherein the stereoscopic video signal processing apparatus being integrated as a television that comprises the video output unit and the signal processor.

* * * * *